United States Patent
Xu et al.

(10) Patent No.: US 11,233,976 B2
(45) Date of Patent: *Jan. 25, 2022

(54) ANOMALOUS STATIONARY OBJECT DETECTION AND REPORTING

(71) Applicant: Intellective Ai, Inc., Dallas, TX (US)

(72) Inventors: Gang Xu, Katy, TX (US); Wesley Kenneth Cobb, The Woodlands, TX (US)

(73) Assignee: Intellective AI, Inc., Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/101,272

(22) Filed: Nov. 23, 2020

(65) Prior Publication Data

US 2021/0092325 A1     Mar. 25, 2021

Related U.S. Application Data

(63) Continuation of application No. 16/284,452, filed on Feb. 25, 2019, now Pat. No. 10,848,715, which is a (Continued)

(51) Int. Cl.
*H04N 7/18* (2006.01)
*G06K 9/62* (2006.01)

(52) U.S. Cl.
CPC ............. *H04N 7/18* (2013.01); *G06K 9/6284* (2013.01); *H04N 7/188* (2013.01)

(58) Field of Classification Search
CPC ......... H04N 7/18; H04N 7/188; G06K 9/6284
See application file for complete search history.

(56) References Cited

U.S. PATENT DOCUMENTS 4,679,077 A    7/1987  Yuasa et al.
5,113,507 A    5/1992  Jaeckel
(Continued)

FOREIGN PATENT DOCUMENTS

WO    WO-2009049314 A2    4/2009

OTHER PUBLICATIONS

Apewokin et al. "Multimodal Mean Adaptive Backgrounding for Embedded Real-Time Video Surveillance," Jun. 2007, IEEE 6 pages, Minneapolis, MN.
(Continued)

*Primary Examiner* — Kathleen V Nguyen
(74) *Attorney, Agent, or Firm* — Cooley LLP

(57) ABSTRACT

Techniques are disclosed for analyzing a scene depicted in an input stream of video frames captured by a video camera. The techniques include receiving data for an object within the scene and determining whether the object has remained substantially stationary within the scene for at least a threshold period. If the object is determined to have remained stationary for at least the threshold period, a rareness score is calculated for the object to indicate a likelihood of the object being stationary to the observed degree at the observed location. The rareness score may use a learning model to take into account previous stationary and/or non-stationary behavior of objects within the scene. In general, the learning model may be updated based on observed stationary and/or non-stationary behaviors of the objects. If the rareness score meets reporting conditions, the stationary object event may be reported.

18 Claims, 4 Drawing Sheets

Related U.S. Application Data continuation of application No. 15/636,872, filed on Jun. 29, 2017, now Pat. No. 10,257,466, which is a continuation of application No. 13/930,190, filed on Jun. 28, 2013, now Pat. No. 9,723,271.

(60) Provisional application No. 61/666,406, filed on Jun. 29, 2012.

(56) References Cited

U.S. PATENT DOCUMENTS

| | | | |
|---|---|---|---|
| 5,748,775 | A | 5/1998 | Tsuchikawa et al. |
| 5,751,378 | A | 5/1998 | Chen et al. |
| 5,969,755 | A | 10/1999 | Courtney |
| 6,252,974 | B1 | 6/2001 | Martens et al. |
| 6,263,088 | B1 | 7/2001 | Crabtree et al. |
| 6,570,608 | B1 | 5/2003 | Tserng |
| 6,661,918 | B1 | 12/2003 | Gordon et al. |
| 6,674,877 | B1 | 1/2004 | Jojic et al. |
| 6,678,413 | B1 | 1/2004 | Liang et al. |
| 6,856,249 | B2 | 2/2005 | Strubbe et al. |
| 6,940,998 | B2 | 9/2005 | Garoutte |
| 7,076,102 | B2 | 7/2006 | Lin et al. |
| 7,136,525 | B1 | 11/2006 | Toyama et al. |
| 7,158,680 | B2 | 1/2007 | Pace |
| 7,200,266 | B2 | 4/2007 | Ozer et al. |
| 7,227,893 | B1 | 6/2007 | Srinivasa et al. |
| 7,436,887 | B2 * | 10/2008 | Yeredor ............ G06K 9/00771 375/240.01 |
| 7,825,954 | B2 | 11/2010 | Zhang et al. |
| 7,868,912 | B2 | 1/2011 | Venetianer et al. |
| 9,723,271 | B2 | 8/2017 | Xu et al. |
| 10,257,466 | B2 | 4/2019 | Xu et al. |
| 10,848,715 | B2 | 11/2020 | Xu et al. |
| 2003/0107650 | A1 | 6/2003 | Colmenarez et al. |
| 2003/0228058 | A1 | 12/2003 | Xie et al. |
| 2004/0151342 | A1 | 8/2004 | Venetianer et al. |
| 2005/0001759 | A1 | 1/2005 | Khosla |
| 2005/0105765 | A1 | 5/2005 | Han et al. |
| 2005/0240629 | A1 | 10/2005 | Gu et al. |
| 2006/0018516 | A1 | 1/2006 | Masoud et al. |
| 2006/0138338 | A1 | 6/2006 | Tezuka et al. |
| 2006/0165386 | A1 | 7/2006 | Garoutte |
| 2006/0190419 | A1 | 8/2006 | Bunn et al. |
| 2006/0193516 | A1 | 8/2006 | Toyama et al. |
| 2006/0222206 | A1 | 10/2006 | Garoutte |
| 2007/0250898 | A1 | 10/2007 | Scanlon et al. |
| 2008/0002856 | A1 | 1/2008 | Ma et al. |
| 2008/0170751 | A1 | 7/2008 | Lei et al. |
| 2008/0181453 | A1 | 7/2008 | Xu et al. |
| 2008/0181499 | A1 | 7/2008 | Yang et al. |
| 2008/0193010 | A1 | 8/2008 | Eaton et al. |
| 2008/0240496 | A1 | 10/2008 | Senior |
| 2008/0247599 | A1 | 10/2008 | Porikli et al. |
| 2008/0252723 | A1 | 10/2008 | Park |
| 2009/0022364 | A1 | 1/2009 | Swaminathan et al. |
| 2009/0067716 | A1 * | 3/2009 | Brown .................. G06K 9/38 382/173 |
| 2009/0210367 | A1 | 8/2009 | Armstrong et al. |
| 2009/0297023 | A1 | 12/2009 | Lipton et al. |
| 2009/0324107 | A1 | 12/2009 | Walch |
| 2010/0063949 | A1 | 3/2010 | Eaton et al. |
| 2010/0150471 | A1 | 6/2010 | Cobb et al. |
| 2010/0322516 | A1 | 12/2010 | Xu et al. |
| 2013/0027556 | A1 | 1/2013 | Clark et al. |
| 2013/0239217 | A1 | 9/2013 | Kindler et al. |
| 2019/0268570 | A1 | 8/2019 | Xu et al. |

OTHER PUBLICATIONS

Connell, J. et al., "Detection and Tracking in the IBM PeopleVision System," IEEE ICME, Jun. 2004, pp. 1-4.

Elgammal et al. "Non-parametric Model for Background Subtraction," Computer Vision Laboratory, University of Maryland; Jun. 2000; 17 pages, College Park, MD.

Grabner, H. et al., "On-line Boosting and Vision," IEEE Conference on Computer Vision and Pattern Recognition (CVPR), 2006, vol. 1, pp. 260-267.

Haritaoglu et al., "W4: Real-Time Surveillance of People and Their Activities," IEEE Transactions on Pattern Analysis and Machine Intelligence, Aug. 2000, vol. 22, No. 8, pp. 809-830.

Haritaoglu, I. et al., "Ghost: A Human Body Part Labeling System Using Silhouettes," 14th Annual International Conference on Pattern Recognition, Aug. 16-20, 1998, Brisbane, Australia, pp. 77-82.

Ivanov et al., "Video Surveillance of Interactions," MIT Media Laboratory, Cambridge, MA, Jul. 1999, 8 pages, Fort Collins, Colorado, US.

Kanerva, P., Chapter 3: "Sparse Distributed Memory and Related Models," In M. H. Hassoun, ed., Associative Neural Memories: Theory and Implementation, 1993, pp. 50-76, New York: Oxford University Press.

Nock, R. et al., "Statistical Region Merging," IEEE Transactions on Pattern Analysis and Machine Intelligence, Nov. 2004, vol. 26(11):1452-1458.

Senior, A. et al., "Appearance Models for Occlusion Handling," IBM T. J. Watson Research Center, 2001, 8 pages, Yorktown, Heights, NY US.

Stauffer, C. et al., "Adaptive background mixture models for real-time tracking," Proceedings IEEE Conference on Computer Vision and Pattern Recognition, 1999: pp. 246-252.

Stauffer, C. et al., "Learning Patterns of Activity Using Real-Time Tracking," IEEE Transactions on Pattern Analysis and Machine Intelligence (TPAMI), Aug. 2000, vol. 22(8):747-757.

* cited by examiner

ANOMALOUS STATIONARY OBJECT DETECTION AND REPORTING

CROSS-REFERENCE TO RELATED APPLICATIONS

This application is a continuation of U.S. patent application Ser. No. 16/284,452, filed Feb. 25, 2019, which is a continuation of U.S. patent application Ser. No. 15/636,872, filed Jun. 29, 2017 and titled "ANOMALOUS STATIONARY OBJECT DETECTION AND REPORTING," now U.S. Pat. No. 10,257,466, which is a continuation of U.S. patent application Ser. No. 13/930,190, filed Jun. 28, 2013, now U.S. Pat. No. 9,723,271, which in turn claims priority to and benefit of U.S. Provisional Patent Application No. 61/666,406, filed on Jun. 29, 2012, the entireties of each of which are expressly incorporated by reference herein for all purposes.

BACKGROUND OF THE INVENTION

Field

Embodiments of the invention provide techniques for analyzing a sequence of video frames. More particularly, to analyzing and learning behavior based on streaming video data, including detection and reporting of anomalous stationary objects.

Description of the Related Art

Some currently available video surveillance systems provide simple object recognition capabilities. For example, a video surveillance system may be configured to classify a group of pixels (referred to as a "blob") in a given frame as being a particular object (e.g., a person or vehicle). Once identified, a "blob" may be tracked from frame-to-frame in order to follow the "blob" moving through the scene over time, e.g., a person walking across the field of vision of a video surveillance camera. Further, such systems may be configured to determine when an object has engaged in certain predefined behaviors. For example, the system may include definitions used to recognize the occurrence of a number of pre-defined events, e.g., the system may evaluate the appearance of an object classified as depicting a car (a vehicle-appear event) coming to a stop over a number of frames (a vehicle-stop event). Thereafter, a new foreground object may appear and be classified as a person (a person-appear event) and the person then walks out of frame (a person-disappear event). Further, the system may be able to recognize the combination of the first two events as a "parking-event."

However, such surveillance systems typically are unable to identify or update objects, events, behaviors, or patterns (or classify such objects, events, behaviors, etc., as being normal or anomalous) by observing what happens in the scene over time; instead, such systems rely on static patterns defined in advance. For example, such surveillance systems are unable to automatically distinguish anomalous stationary objects (e.g., a suspicious stationary package) in a scene from ordinary stationary objects (e.g., trash thrown in a trash bin) in the scene and report instances of anomalous stationary objects to a user.

SUMMARY

One embodiment provides a method for analyzing a scene captured by a video camera or other recorded video. The method generally includes determining, via one or more processors, whether an object has remained within the scene for at least a threshold period. The method also includes determining whether the object has remained substantially stationary. If the object is determined to have remained substantially stationary and remained within the scene for at least the threshold period, the method includes further determining a rareness score for the object. The rareness score indicates a likelihood of the object being substantially stationary at an observed location, and is determined based at least on a learned model of previous object behavior within the scene. In addition, the method includes generating an alert or reporting the object upon determining the rareness score exceeds a threshold.

Other aspects include a computer-readable medium that includes instructions that enable a processing unit to implement one or more aspects of the disclosed method as well as a system configured to implement one or more aspects of the disclosed method.

BRIEF DESCRIPTION OF THE DRAWINGS

So that the manner in which the above recited features, advantages, and objects of the present invention are attained and can be understood in detail, a more particular description of the invention, briefly summarized above, may be had by reference to the embodiments illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
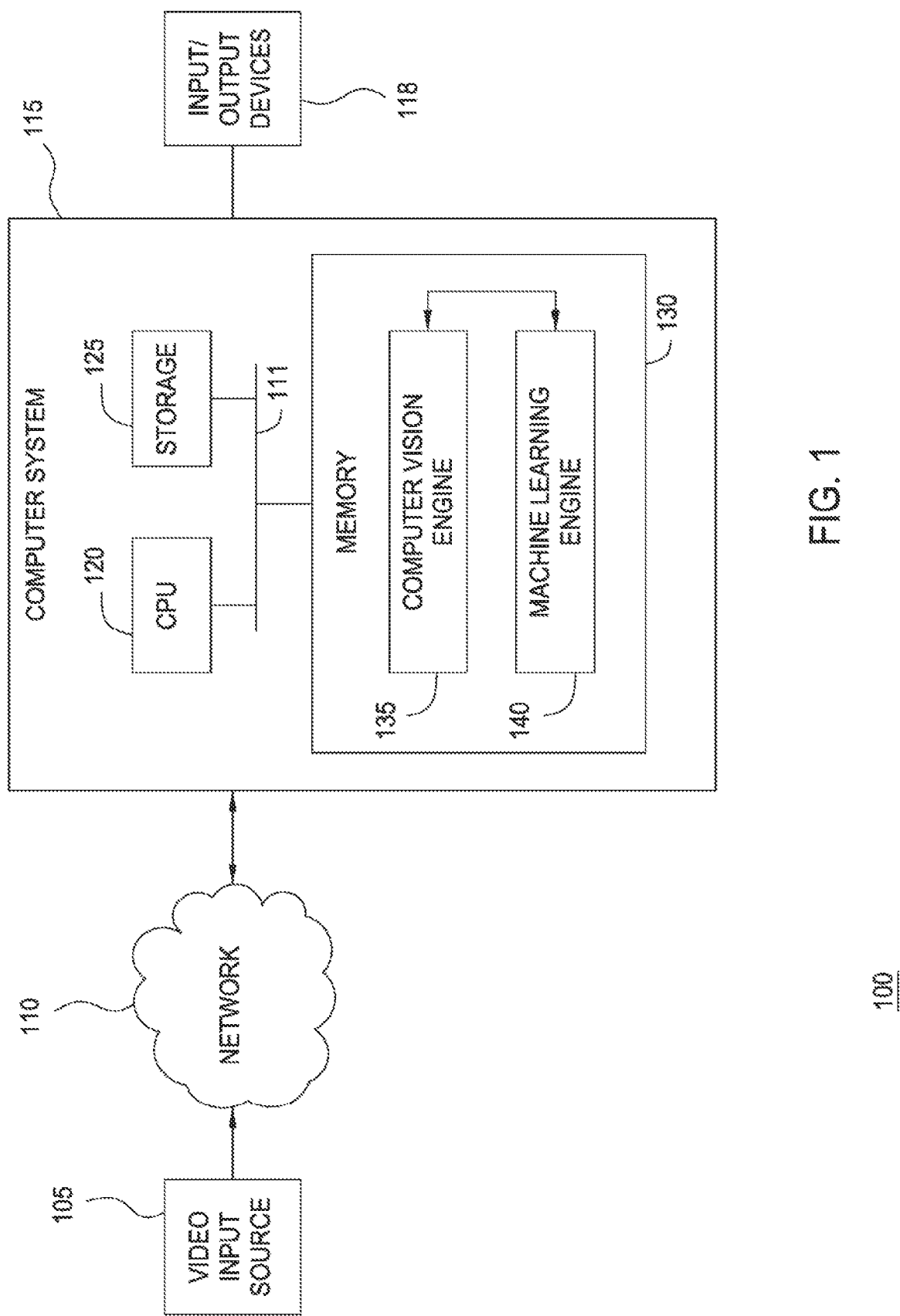
FIG. 1 illustrates components of a video analysis system, according to one embodiment of the invention.

Embodiments of the present invention provide a method and a system for analyzing and learning behavior based on an acquired stream of video frames. A machine-learning video analytics system may be configured to use a computer vision engine to observe a scene, generate information streams of observed activity, and to pass the streams to a machine learning engine. In turn, the machine learning engine may engage in an undirected and unsupervised learning approach to learn patterns regarding the object behaviors in that scene. Thereafter, when unexpected (i.e., abnormal or unusual) behavior is observed, alerts may be generated.

In addition to the learning-based behavior, the machine learning engine may be configured to build models of certain category of behaviors within the scene and determine whether observations indicate that the behavior of an object is anomalous or not, relative to the model. In one embodiment, e.g., the machine learning engine may include a module for detecting when a stationary object has been discarded in an unusual or anomalous manner relative to prior observations of the scene. That is, such a module may be used to determine whether a foreground object is an abnormal stationary object within a given scene.

To make such a determination, the detection module may be configured to evaluate whether the foregoing object remains abnormally stationary in the scene for a long period of time (i.e., greater than, or greater than or equal to, a threshold time period). The actual threshold period may be set as a matter of preference (e.g., 1 minute) but may also be based on a distribution of how long foreground objects, or foreground objects of a given type (i.e., foreground objects clustered by the machine learning engine as sharing enough similar features to be considered to be instances of the same object type), previously remained stationary. Upon determining that the foreground object has remained relatively stationary at a given location for greater than the threshold period, the detection module may further compute a rareness score based on how stationary the object is and how frequently objects in general (or objects of the same type) are expected to remain relatively stationary at the observed location.

In the following, reference is made to embodiments of the invention. However, it should be understood that the invention is not limited to any specifically described embodiment. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Examples of computer-readable storage media include (i) non-writable storage media (e.g., read-only memory devices within a computer such as CD-ROM or DVD-ROM disks readable by an optical media drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other examples media include communications media through which information is conveyed to a computer, such as through a computer or telephone network, including wireless communications networks.

In general, the routines executed to implement the embodiments of the invention may be part of an operating system or a specific application, component, program, module, object, or sequence of instructions. The computer program of the present invention is comprised typically of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 illustrates components of a video analysis and behavior-recognition system 100, according to one embodiment of the present invention. As shown, the behavior-recognition system 100 includes a video input source 105, a network 110, a computer system 115, and input and output devices 118 (e.g., a monitor, a keyboard, a mouse, a printer, and the like). The network 110 may transmit video data recorded by the video input 105 to the computer system 115. Illustratively, the computer system 115 includes a CPU 120, storage 125 (e.g., a disk drive, optical disk drive, floppy disk drive, and the like), and a memory 130 which includes both a computer vision engine 135 and a machine-learning engine 140. As described in greater detail below, the computer vision engine 135 and the machine-learning engine 140 may provide software applications configured to analyze a sequence of video frames provided by the video input 105.

Network 110 receives video data (e.g., video stream(s), video images, or the like) from the video input source 105. The video input source 105 may be a video camera, a VCR, DVR, DVD, computer, web-cam device, or the like. For example, the video input source 105 may be a stationary video camera aimed at a certain area (e.g., a subway station, a parking lot, a building entry/exit, etc.), which records the events taking place therein. Generally, the area visible to the camera is referred to as the "scene." The video input source 105 may be configured to record the scene as a sequence of individual video frames at a specified frame-rate (e.g., 24 frames per second), where each frame includes a fixed number of pixels (e.g., 320×240). Each pixel of each frame may specify a color value (e.g., an RGB value) or grayscale value (e.g., a radiance value between 0-255). Further, the video stream may be formatted using known formats including MPEG2, MJPEG, MPEG4, H.263, H.264, and the like.

As noted above, the computer vision engine 135 may be configured to analyze this raw information to identify active objects in the video stream, identify a variety of appearance and kinematic features used by a machine learning engine 140 to derive object classifications, derive a variety of metadata regarding the actions and interactions of such objects, and supply this information to the machine-learning engine 140. And in turn, the machine-learning engine 140 may be configured to evaluate, observe, learn and remember details regarding events (and types of events) that transpire within the scene over time.

In one embodiment, the machine-learning engine 140 receives the video frames and the data generated by the computer vision engine 135. The machine-learning engine 140 may be configured to analyze the received data, cluster objects having similar visual and/or kinematic features, build semantic representations of events depicted in the video frames. Over time, the machine learning engine 140 learns expected patterns of behavior for objects that map to a given cluster. Thus, over time, the machine learning engine learns from these observed patterns to identify normal and/or abnormal events. That is, rather than having patterns, objects, object types, or activities defined in advance, the machine learning engine 140 builds its own model of what different object types have been observed (e.g., based on clusters of kinematic and or appearance features) as well as a model of expected behavior for a given object type. In particular, the machine learning engine may model the kinematic properties of one or more types of objects (e.g., whether those objects tend to remain stationary or tend to move). Thereafter, the machine learning engine can decide whether an observed stationary object at a location within the scene is anomalous based on a rareness of the object being stationary to the degree observed at the observed location.

Data describing whether an anomalous stationary object has been determined and/or describing the anomalous stationary object may be provided to output devices 118 to issue alerts (e.g., an alert message presented on a GUI interface screen).

In general, the computer vision engine 135 and the machine-learning engine 140 both process video data in real-time. However, time scales for processing information by the computer vision engine 135 and the machine-learning engine 140 may differ. For example, in one embodiment, the computer vision engine 135 processes the received video data frame-by-frame, while the machine-learning engine 140 processes data every N-frames. In other words, while the computer vision engine 135 may analyze each frame in real-time to derive a set of appearance and kinematic data related to objects observed in the frame, the machine-learning engine 140 is not constrained by the real-time frame rate of the video input.

Note, however, FIG. 1 illustrates merely one possible arrangement of the behavior-recognition system 100. For example, although the video input source 105 is shown connected to the computer system 115 via the network 110, the network 110 is not always present or needed (e.g., the video input source 105 may be directly connected to the computer system 115). Further, various components and modules of the behavior-recognition system 100 may be implemented in other systems. For example, in one embodiment, the computer vision engine 135 may be implemented as a part of a video input device (e.g., as a firmware component wired directly into a video camera). In such a case, the output of the video camera may be provided to the machine-learning engine 140 for analysis. Similarly, the output from the computer vision engine 135 and machine-learning engine 140 may be supplied over computer network 110 to other computer systems. For example, the computer vision engine 135 and machine-learning engine 140 may be installed on a server system and configured to process video from multiple input sources (i.e., from multiple cameras). In such a case, a client application 250 running on another computer system may request (or receive) the results of over network 110.

Figure 2:
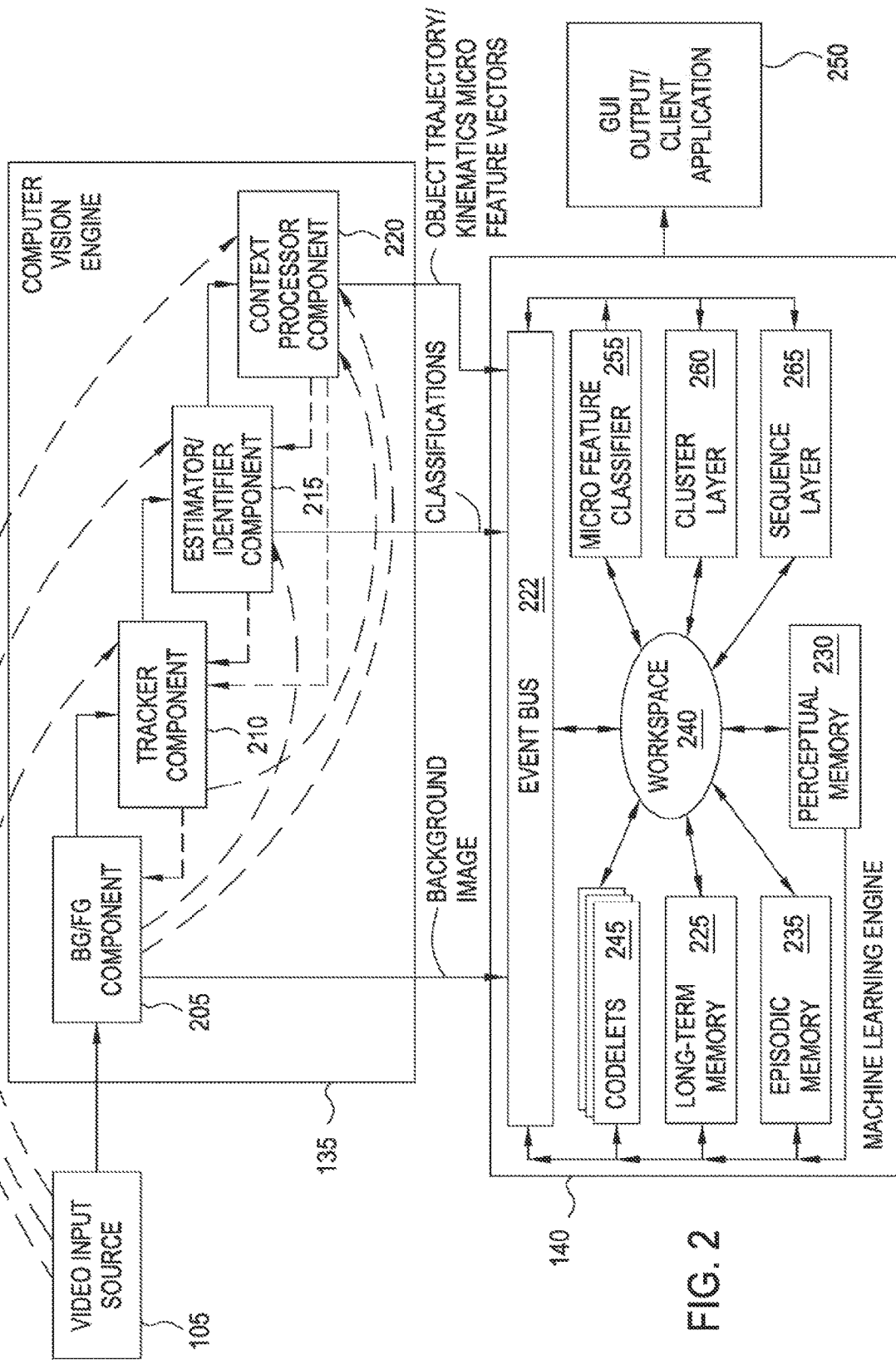
FIG. 2 further illustrates components of the video analysis system shown in FIG. 1, according to one embodiment of the invention.

FIG. 2 further illustrates components of the computer vision engine 135 and the machine-learning engine 140 first illustrated in FIG. 1, according to one embodiment of the invention. As shown, the computer vision engine 135 includes a background/foreground (BG/FG) component 205, a tracker component 210, an estimator/identifier component 215, and a context processor component 220. Collectively, the components 205, 210, 215, and 220 provide a pipeline for processing an incoming sequence of video frames supplied by the video input source 105 (indicated by the solid arrows linking the components). Additionally, the output of one component may be provided to multiple stages of the component pipeline (as indicated by the dashed arrows) as well as to the machine-learning engine 140. In one embodiment, the components 205, 210, 215, and 220 may each provide a software module configured to provide the functions described herein. Of course one of ordinary skill in the art will recognize that the components 205, 210, 215, and 220 may be combined (or further subdivided) to suit the needs of a particular case and further that additional components may be added (or some may be removed).

In one embodiment, the BG/FG component 205 may be configured to separate each frame of video provided by the video input source 105 into a static part (the scene background) and a collection of volatile parts (the scene foreground.) The frame itself may include a two-dimensional array of pixel values for multiple channels (e.g., RGB channels for color video or grayscale channel or radiance channel for black and white video). In one embodiment, the BG/FG component 205 may model background states for each pixel using an adaptive resonance theory (ART) network. That is, each pixel may be classified as depicting scene foreground or scene background using an ART network modeling a given pixel. Of course, other approaches to distinguish between scene foreground and background may be used.

Additionally, the BG/FG component 205 may be configured to generate a mask used to identify which pixels of the scene are classified as depicting foreground and, conversely, which pixels are classified as depicting scene background. The BG/FG component 205 then identifies regions of the scene that contain a portion of scene foreground (referred to as a foreground "blob" or "patch") and supplies this information to subsequent stages of the pipeline. Additionally, pixels classified as depicting scene background maybe used to generate a background image modeling the scene.

The tracker component 210 may receive the foreground patches produced by the BG/FG component 205 and generate computational models for the patches. The tracker component 210 may be configured to use this information, and each successive frame of raw-video, to attempt to track the motion of an object depicted by a given foreground patch as it moves about the scene. That is, the tracker component 210 provides continuity to other elements of the system by tracking a given object from frame-to-frame.

The estimator/identifier component 215 may receive the output of the tracker component 210 (and the BF/FG component 205) and identify a variety of kinematic and/or appearance features of a foreground object, e.g., size, height, width, and area (in pixels), reflectivity, shininess rigidity, speed velocity, etc.

The context processor component 220 may receive the output from other stages of the pipeline (i.e., the tracked objects, the background and foreground models, and the results of the estimator/identifier component 215). Using this information, the context processor 220 may be configured to generate a stream of context events regarding objects tracked (by tracker component 210) and evaluated (by estimator identifier component 215). For example, the context processor component 220 may package a stream of micro-feature vectors and kinematic observations of an object and output this to the machine-learning engine 140, e.g., at a rate of 5 Hz. In one embodiment, the context events are packaged as a trajectory. As used herein, a trajectory generally refers to a vector packaging the kinematic data of a particular foreground object in successive frames or samples. Each element in the trajectory represents the kinematic data captured for that object at a particular point in time. Typically, a complete trajectory includes the kinematic data obtained when an object is first observed in a frame of video along with each successive observation of that object up to when it leaves the scene (or becomes stationary to the point of dissolving into the frame background). Accordingly, assuming computer vision engine 135 is operating at a rate of 5 Hz, a trajectory for an object is updated every 200 milliseconds, until complete.

The computer vision engine 135 may take the output from the components 205, 210, 215, and 220 describing the motions and actions of the tracked objects in the scene and supply this information to the machine-learning engine 140. Illustratively, the machine-learning engine 140 includes a long-term memory 225, a perceptual memory 230, an episodic memory 235, a workspace 240, codelets 245, a micro-feature classifier 255, a cluster layer 260 and a sequence layer 265. Additionally, the machine-learning engine 140 has an interface to a client application 250, allowing the user to interact with the video surveillance system 100 using a graphical user interface. Further still, the machine-learning engine 140 includes an event bus 222. In one embodiment, the components of the computer vision engine 135 and machine-learning engine 140 output data to the event bus 222. At the same time, the components of the machine-learning engine 140 may also subscribe to receive different event streams from the event bus 222. For example, the micro-feature classifier 255 may subscribe to receive the micro-feature vectors output from the computer vision engine 135.

Generally, the workspace 240 provides a computational engine for the machine-learning engine 140. For example, the workspace 240 may be configured to copy information from the perceptual memory 230, retrieve relevant memories from the episodic memory 235 and the long-term memory 225, select which codelets 245 to execute. Each codelet 245 may be a software program configured to evaluate different sequences of events and to determine how one sequence may follow (or otherwise relate to) another (e.g., a finite state machine). More generally, each codelet may provide a software module configured to detect interesting patterns from the streams of data fed to the machine-learning engine. In turn, the codelet 245 may create, retrieve, reinforce, or modify memories in the episodic memory 235 and the long-term memory 225. By repeatedly scheduling codelets 245 for execution, copying memories and percepts to/from the workspace 240, the machine-learning engine 140 performs a cognitive cycle used to observe, and learn, about patterns of behavior that occur within the scene.

In one embodiment, the perceptual memory 230, the episodic memory 235, and the long-term memory 225 are used to identify patterns of behavior, evaluate events that transpire in the scene, and encode and store observations. Generally, the perceptual memory 230 receives the output of the computer vision engine 135 (e.g., the context event stream). The episodic memory 235 stores data representing observed events with details related to a particular episode, e.g., information describing time and space details related to an event. That is, the episodic memory 235 may encode specific details of a particular event, i.e., "what and where" something occurred within a scene, such as a particular vehicle (car A) moved to a location believed to be a parking space (parking space 5) at 9:43 AM.

In contrast, the long-term memory 225 may store data generalizing events observed in the scene. To continue with the example of a vehicle parking, the long-term memory 225 may encode information capturing observations and generalizations learned by an analysis of the behavior of objects in the scene such as "vehicles in certain areas of the scene tend to be in motion," "vehicles tend to stop in certain areas of the scene," etc. Thus, the long-term memory 225 stores observations about what happens within a scene with much of the particular episodic details stripped away. In this way, when a new event occurs, memories from the episodic memory 235 and the long-term memory 225 may be used to relate and understand a current event, i.e., the new event may be compared with past experience, leading to both reinforcement, decay, and adjustments to the information stored in the long-term memory 225, over time. In a particular embodiment, the long-term memory 225 may be implemented as an ART network and a sparse-distributed memory data structure.

The micro-feature classifier 255 may schedule a codelet 245 to evaluate the micro-feature vectors output by the computer vision engine 135. As noted, the computer vision engine 135 may track objects frame-to-frame and generate micro-feature vectors for each foreground object at a rate of, e.g., 5 Hz. In one embodiment, the micro-feature classifier 255 may be configured to create clusters from this stream of micro-feature vectors. For example, each micro-feature vector may be supplied to an input layer of the ART network (or a combination of a self organizing map (SOM) and ART network used to cluster nodes in the SOM). In response, the ART network maps the micro-feature vector to a cluster in the ART network and updates that cluster (or creates a new cluster if the input micro-feature vector is sufficiently dissimilar to the existing clusters). Each cluster is presumed to represent a distinct object type, and objects sharing similar micro-feature vectors (as determined using the choice and vigilance parameters of the ART network) may map to the same cluster.

For example, the micro-features associated with observations of many different vehicles may be similar enough to map to the same cluster (or group of clusters). At the same time, observations of many different people may map to a different cluster (or group of clusters) than the vehicles cluster. Thus, each distinct cluster in the art network generally represents a distinct type of object acting within the scene. And as new objects enter the scene, new object types may emerge in the ART network.

Importantly, however, this approach does not require the different object type classifications to be defined in advance; instead, object types emerge over time as distinct clusters in the ART network. In one embodiment, the micro-feature classifier 255 may assign an object type identifier to each cluster, providing a different object type for each cluster in the ART network.

In an alternative embodiment, rather than generate clusters from the micro-features vector directly, the micro-feature classifier 255 may supply the micro-feature vectors to a self-organizing map structure (SOM). In such a case, the ART network may cluster nodes of the SOM—and assign an object type identifier to each cluster. In such a case, each SOM node mapping to the same cluster is presumed to represent an instance of a common type of object.

As shown, the machine-learning engine 140 also includes a cluster layer 260 and a sequence layer 265. As described in greater detail below, the cluster layer 260 may be configured to generate clusters from the trajectories of objects classified by the micro-feature classifier 255 as being an instance of a common object type. In one embodiment, the cluster layer 260 uses a combination of a self-organizing map (SOM) and an ART network to cluster the kinematic data in the trajectories. Once the trajectories are clustered, the sequence layer 265 may be configured to generate sequences encoding the observed patterns of behavior represented by the trajectories. And once generated, the sequence layer may identify segments within a sequence using a voting experts technique. Further, the sequence layer 265 may be configured to identify anomalous segments and sequences.

In addition to the learning process discussed above, embodiments may be configured to learn stationary/non-stationary behaviors of various object types and generate alerts when an anomalous stationary object is identified, as discussed in greater detail below.

Detecting Anomalous Stationary Objects in a Machine-Learning Video Analytics System As noted above, a machine-learning video analytics system may be configured to use a computer vision engine to observe a scene, generate information streams of observed activity, and to pass the streams to a machine learning engine. In turn, the machine learning engine may engage in an undirected and unsupervised learning approach to learn patterns regarding the object behaviors in that scene. Thereafter, when unexpected (i.e., abnormal or unusual) behavior is observed, alerts may be generated.

In addition to the learning-based behavior, the machine learning engine may be configured to build models of certain category of behaviors within the scene and determine whether observations indicate that the behavior of an object is anomalous or not, relative to the model. In one embodiment, e.g., the machine learning engine may include a module for detecting when a stationary object has been discarded in an unusual or anomalous manner relative to prior observations of the scene. That is, such a module may be used to determine whether a foreground object is an abnormal stationary object within a given scene.

To make such a determination, the detection module may be configured to evaluate whether the foregoing object remains abnormally stationary in the scene for a long period of time (i.e., greater than, or greater than or equal to, a threshold time period). The actual threshold period may be set as a matter of preference (e.g., 1 minute) but may also be based on a distribution of how long foreground objects, or foreground objects of a given type (i.e., foreground objects clustered by the machine learning engine as sharing enough similar features to be considered to be instances of the same object type), previously remained stationary. Upon determining that the foreground object has remained relatively stationary at a given location for greater than the threshold period, the detection module may further compute a rareness score based on how stationary the object is and how frequently objects in general (or objects of the same type) are expected to remain relatively stationary at the observed location.

Figure 3:
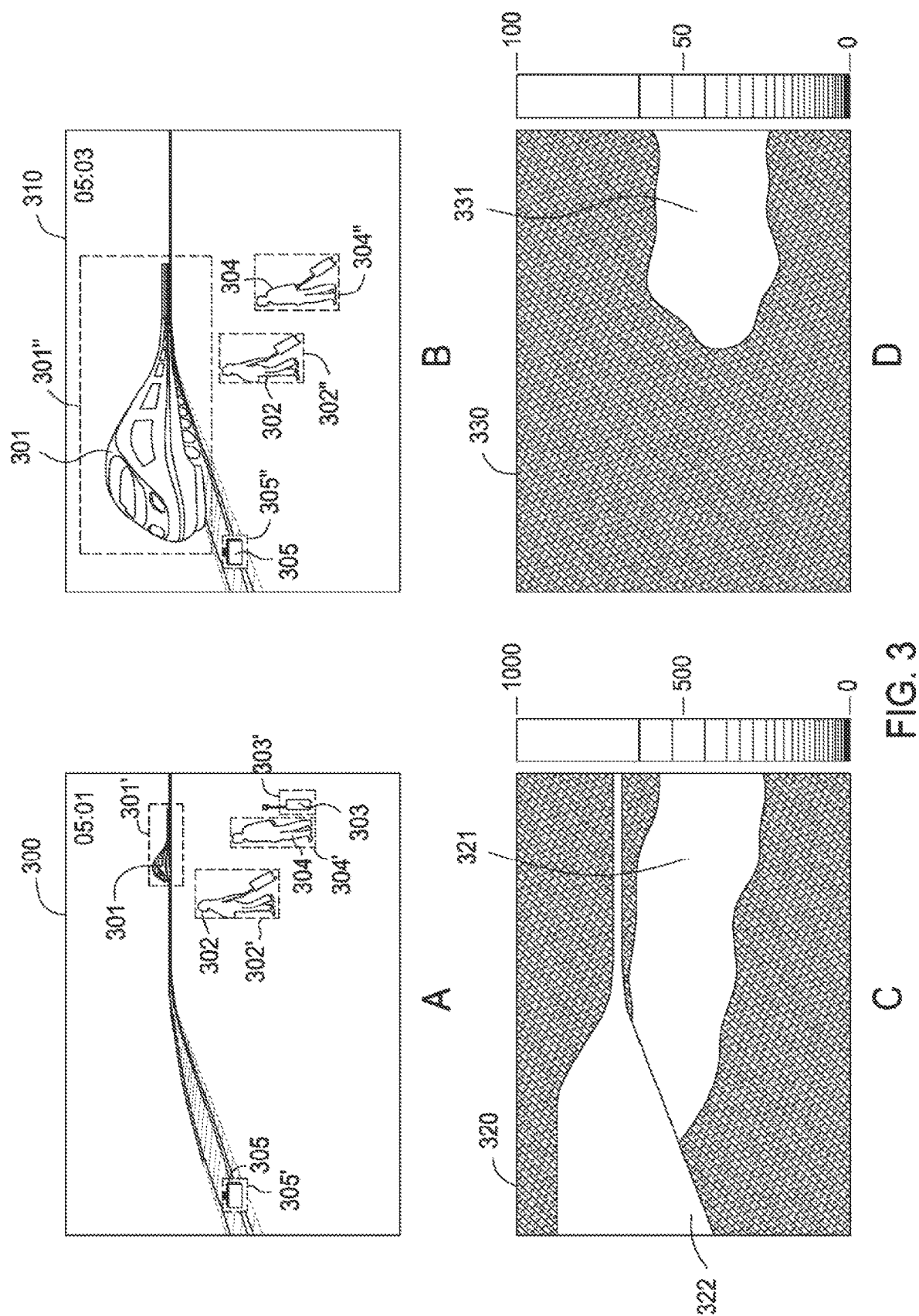
FIG. 3 illustrates example video frames and stationary and non-stationary count maps generated from a plurality of such video frames, according to one embodiment of the invention.

FIG. 3 illustrates example video frames and stationary and non-stationary count maps generated from a plurality of such video frames, according to one embodiment. Panel A depicts a scene of a train station. The scene includes a train 301, two passengers 302, 304, and two suitcases 303, 305. As discussed, a computer vision engine may identify the train 301, passengers 302, 304, and suitcases 303, 305 as foreground objects because pixel values associated with these objects may differ from those of a background model of the train station that includes the train tracks, platform, etc. Illustratively, the computer vision engine may treat the passenger 302 and his/her suitcase as a single foreground object and the passenger 304 and his/her suitcase 303 as distinct foreground objects because there is some separation between the pixels of the passenger 304 and those of the suitcase 303 but no separation between the pixels of the passenger 302 and those of his/her suitcase. Additionally, the computer vision engine may track each of the foreground objects using a respective bounding box 301'-305', shown as ghosted lines.

Panel B depicts a second frame of the sequence of video frames. As shown, the second frame depicts the same scene as does the first frame, but at a later time. In the scene of panel B, the passengers 302, 304 and their corresponding bounding boxes 302", 304" have moved to the left of the scene. Illustratively, the suitcase 303 and the passenger 304 are now regarded as a single object 304 because the pixels of the passenger 304 and those of the suitcase 303 are no longer separated by background pixels. In general, an object may "disappear" in this manner, or if the object leaves the scene entirely. Conversely, objects may "appear" as they enter the scene and when, for example, passengers leave suitcases on the ground and the computer vision engine begins tracking the passengers and the suitcases as separate objects.

Note, bounding boxes 301"-302" and 304" have null intersections with bounding boxes 301'-302' and 304', respectively. That is, none of the pixels within the bounding boxes 301"-302" and 304" of panel B are also in bounding boxes 301'-302' and 304', respectively, of panel A, and vice versa. By contrast, the suitcase 305 has not moved in the scene. As a result, its respective bounding box 305" in Panel B has non-zero intersection with the bounding box 305' in Panel A.

Based on the intersections of the bounding box 305' with the bounding box 305" during a tracking period (i.e., the entire period of time during which the object is tracked) that lasts for more than a predefined threshold period, a detection module may determine that the suitcase 305 is a stationary object. Conversely, the detection module may determine that the passengers 302, 304; the suitcase 303; and the train 301 are not stationary objects because of the lack of intersecting bounding boxes during a tracking period that lasts for more than the predefined threshold period. Further, the detection module may determine how stationary or non-stationary the object is. For example, the suitcase 305 and its corresponding bounding box 305' may move slightly over the tracking period, and the detection module may account for this slight movement by decreasing a stationarity score for the suitcase based on the amount of movement and the length of the tracking period, as discussed in greater detail below.

Panels C and D illustrate a non-stationary count map 320 and a stationary count map, respectively. As shown in panel C, white regions 321, 322 of the non-stationary count map 320 indicate areas of the scene where a relatively greater number (e.g., thousands) of non-stationary objects have been observed. In particular, the regions 321, 322 may correspond to pixels of the scene where non-stationary passengers, luggage, trains, etc. have previously appeared. By contrast, the other regions of the non-stationary count map 320 are black, indicating that no non-stationary objects appeared in those regions. In one embodiment, the non-stationary count map 320 may incorporate a decay so that counts are weighted more toward recently observed non-stationary objects.

As shown in the stationary count map 300 of panel D, white region 331 indicates an area of the scene where a relatively greater number (e.g., hundreds) of stationary objects have been observed. For example, the region 331 may correspond to pixels of the scene where stationary luggage, suitcases, etc. have previously appeared. The other regions of the stationary count map are black, indicating that no stationary objects were previously observed in those regions. In one embodiment, the stationary count map may incorporate a decay so that counts are weighted more toward recently observed stationary objects.

As discussed in greater detail below, the detection module may determine whether a given stationary object is rare, and therefore anomalous, based on the non-stationary count map, the stationary count map, and how stationary the object is. In general, the detection module may be configured to assess a higher rareness score (i.e., indicate that an event is more rare) when an object remains relatively stationary in a region where relatively fewer past objects have been stationary and/or where past objects have tended to be non-stationary.

Figure 4:
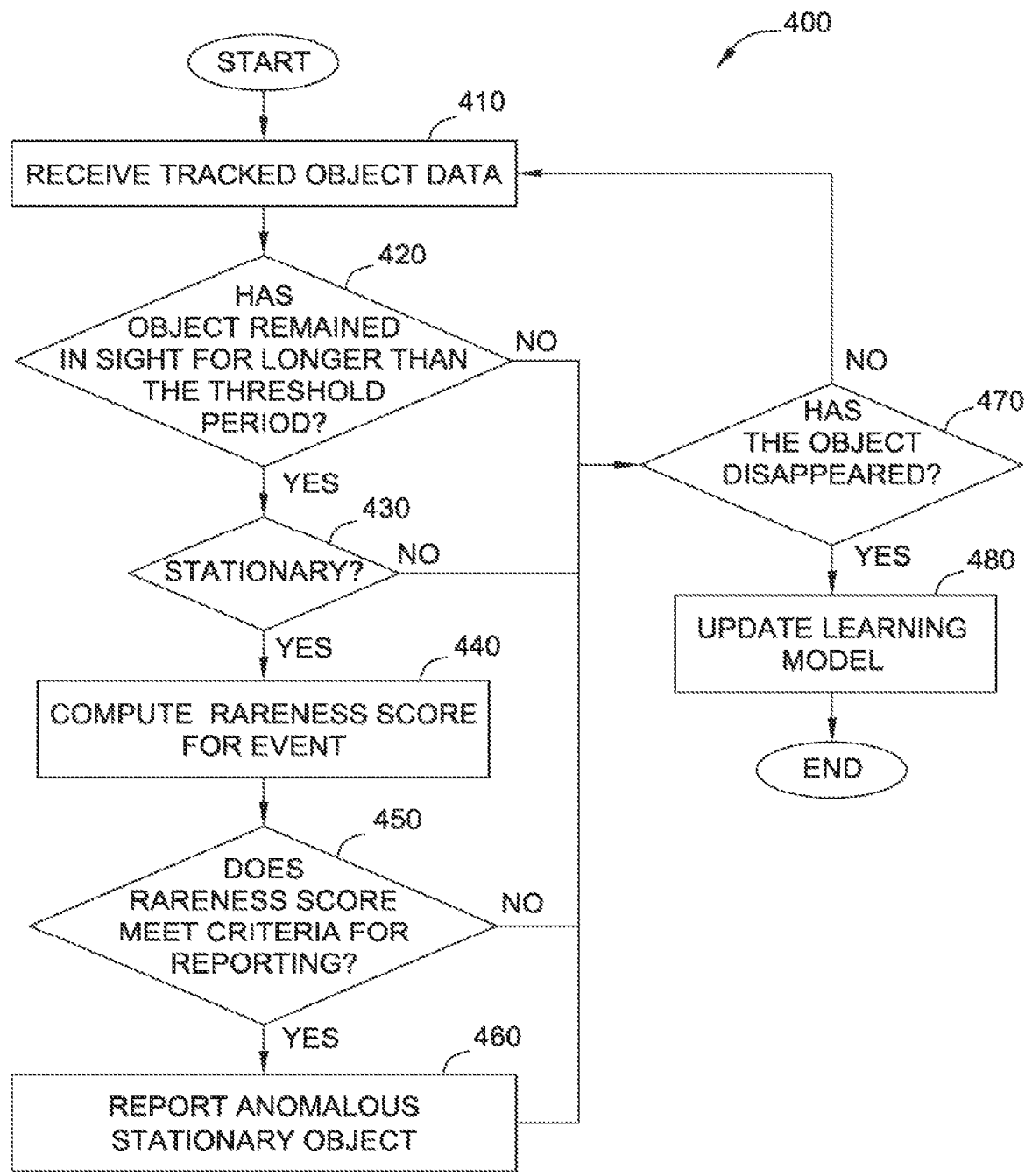
FIG. 4 illustrates a method for detecting and reporting anomalous stationary objects, according to one embodiment of the invention.

FIG. 4 illustrates a method 400 for detecting and reporting anomalous stationary objects, according to one embodiment of the invention. As shown, the method 400 begins at step 410, where the detection module receives data for a tracked foreground object. Such data may include frames of a video sequence in which the foreground object appears, a bounding box of the object within those frames, a type of the object (e.g., foreground objects may be clustered by the machine learning engine as sharing enough similar features to be considered to be instances of the same object type), etc.

At step 420 the detection module determines, based on the received data, whether the object has remained in sight for longer than a threshold period (e.g., 1 minute). For example, the detection module may keep track of the number of frames in which the object appears and determine whether that number exceeds a predefined number. If the object does not appear in the predefined number of frames, the object cannot be stationary within the scene for at least the threshold period because it has entered and exited the scene in less time than that time period. The actual threshold period may be set as a matter of preference (e.g., 1 minute); based on a distribution of how long foreground objects, or foreground objects of a given type, previously remained stationary; or the like.

If the detection module determines at step 420 that the object has remained in the scene for longer than the threshold period, the method 400 continues at step 430, where the detection module determines whether the object is at least somewhat stationary or not based on the received data. In one embodiment, the detection module determines whether the intersection of the bounding box of the object across every frame in which the object is tracked is non-zero. As discussed above, a null intersection would indicate that the object has moved through the scene (i.e., has not remained stationary) during a tracking period. By contrast, a non-zero intersection may indicate that the object has remained at least somewhat stationary during the tracking period.

If the detection module determines that the object is at least somewhat stationary at step 430, the method 400 continues at step 440, where the detection module computes a rareness score for the event. In general, the detection module may be configured to assess a higher rareness score (i.e., indicate that an event is more rare) where an object remains relatively stationary in a region where relatively fewer past objects (or objects of the same type) have been stationary and/or where past objects (or objects of the same type) have tended to be non-stationary.

In one embodiment, the rareness score may be determined according to the following formula:

$$R = S \times (1.0 - F)\left(1 - \frac{stddev}{average}\right), \quad (1)$$

where S represents a stationarity score (i.e., how stationary the object has remained) given by $S=N_i/N_s$, $N_i$ being the number of intersection pixels of the object's bounding boxes during all its past time period, and $N_s$ being the union of pixels covered by the bounding boxes during the tracking period for the object; F represents a frequency score given by $F=N_s/N_a$, $N_s$ being the sum of counts of stationary objects over the tracking pixels (i.e., the sum of the count values of the stationary count map for the pixels covered by the bounding box of the object during the tracking period), and $N_a$ being the sum of stationary and non-stationary counts of all objects over all pixels (i.e., the sum of all count values of the stationary and non-stationary count maps); and $$1 - \frac{stddev}{average}$$

is a term equal to one minus the standard deviation of the size of a bounding box used to track the object in the frames divided by the average size of the bounding box. As is clear from equation (1), the higher the frequency F, the lower 1−F will be, and, as a result, the lower the overall rareness score R will be. At the same time, the higher the stationarity score S, the higher the resulting rareness score R. The term $$1 - \frac{stddev}{average}$$

accounts for changes in the size (e.g., width×height) of the bounding box of the object, as such changes, which reduce the term $$1 - \frac{stddev}{average},$$

may be false positive stationary objects. That is, an object whose size changes more, and is accordingly more likely to be a false positive, may be associated with a lower $$1 - \frac{stddev}{average}$$

term and thus a lower rarity score R. For example, a reflection on an object or a glossy metal surface, which may otherwise be mistaken for stationary objects, may change in size over time and thus be associated with lower rarity scores R.

At step 450, the detection module determines whether the rareness score computed at step 440 meets a predefined criterion or criteria for reporting. For example, a criterion for reporting could be that the rareness score exceeds a threshold value. If the detection module determines at step 450 that the rareness score meets the predefined criterion or criteria, the method 400 continues at step 460, where the detection module reports the stationary object. The detection module may, for example, issue an alert to a user interface, thereby notifying the user of the anomalous stationary object.

In one embodiment, alerts may be assigned a measure of severity (e.g., a value ranging from 0.0 to 1.0) and sorted into levels based on the measure (e.g., a high severity for alerts with a measure from 0.8 to 1.0). In some cases, the detection module and the machine learning engine may generate a large volume of alerts. One approach for limiting the number of alerts presented to a user is simply to provide a cutoff for the alerts of a given type, or a cutoff for the severity of alerts published by the machine learning engine. However, doing so does not account for the differences between different alert types or for the relative frequency of different alert types.

Accordingly, one embodiment provides a framework for normalizing the number of alerts generated for multiple disjoint alert types in a behavioral recognition system. In particular, a user may provide a desired alert-publication rate along with the relative weights of different alert types. For example, a user may wish to see the top 100 alerts, distributed equally across alert types. In such a case, an alert normalization module may evaluate a distribution of previously published alerts (e.g., over the last N number of day) for each alert type to identify a distribution of alerts of each type. Once the distribution is determined, a severity expected to result in the correct number of alerts for that type may be determined. Assume, e.g., that a user specifies a desired publication rate of 100 total alerts for four different alert types. In such a case, the normalization module identifies a measure of alert severity for each alert type expected to result in twenty-five alerts of each type. This approach ensures that the number of alerts generated for each type should generally conform to the desired number of alerts, as well as be limited to the most severe alerts of any given type.

More specifically, the normalization module (1) brings statistical consistency across a rareness value from different alert types and (2) ensures an average number of alerts that would be published from the behavioral recognition system irrespective of the number of alert types in the system. In addition to relying on previously observed alert counts to generate the alert normalization values—and set alert rareness values based on the normalized alert values, the normalization module may also respond dynamically to increases in alert volume. Returning to an example where a user has requested to limit the overall alert volume to the top 100 alerts each day, distributed equally across four alert types, assume that changes in expected behavior in the scene result in 25 alerts of a first alert type being generated early in the day. In such a case, the alert normalization module could begin increasing the rareness value required for an alert of the first type to be published.

If no responses are provided at steps 420, 430, or 450, or after reporting the anomalous stationary object at step 460, the method 400 continues at step 470, where the detection module determines whether the object has disappeared from the scene. If the object has not disappeared from the scene, the method 400 returns to step 410, where additional object data is received. Based on this additional data, the detection module may determine whether the object should be reported (or re-reported) as an anomalous stationary object. By contrast, if the detection module determines that the object has disappeared from the scene at step 470, the method 400 continues at step 480, where the detection module updates the learning model for determining rareness based on the location(s) of the object within the scene and whether the object remained relatively stationary (e.g., based on a non-zero bounding box intersection) or not. In one embodiment, the detection module may add 1 to the pixel count values in area(s) of a stationary or non-stationary count map which were covered by the object depending on whether the object remained relatively stationary or not.

In one embodiment, the detector module may further store a list of disappeared stationary objects using a buffer. For example, an object may appear in the scene, remain stationary for a short period, and be occluded by another object. When the object reappears from behind the other object, the detector module may compare the object to disappeared stationary objects of the buffer to determine whether the object is one of those objects, as opposed to a new object that has appeared in the scene. The time during which the object has remained stationary may then be taken to be the total time the object has remained either stationary or occluded, as opposed to only the time the object was stationary and visible before being occluded.

In another embodiment, the detector module may further store a list of previously determined anomalous stationary objects using a buffer. The buffer is used to solve the issue of "ghost" stationary objects created when a previous anomalous stationary object is removed. As discussed above, the computer vision engine may continuously update the background model which reflects static elements of the scene. As a result, the computer vision engine may, over time, "absorb" the anomalous stationary object into the background. For example, if a plant is placed within the scene, the detector module may initially generate an anomalous stationary object alert. However, over time, the computer vision engine may absorb the plant into the background. When the plant is removed again, the background must again be updated. Before such an update occurs, the computer vision engine may determine that a ghost foreground object has appeared because the pixels which represented the plant (i.e., the background pixels) have changed. Further, the detection module may generate a false report of an anomalous stationary object corresponding to the ghost foreground object. By comparing the ghost object to objects in the buffer, described above, the computer vision engine and/or the detection module may determine that the ghost object, for example, covers the same pixels as a previous anomalous stationary object and is therefore not an actual foreground object.

While the foregoing is directed to embodiments of the present invention, other and further embodiments of the invention may be devised without departing from the basic scope thereof, and the scope thereof is determined by the claims that follow.

What is claimed is:
1. A computer-implemented method, comprising:
analyzing, via one or more processors, an input data stream including data representing a plurality of video frames that depict a scene;
generating, via the one or more processors and based on the input data stream, a first map including pixel count values associated with at least one non-stationary object;
generating, via the one or more processors and based on the input data stream, a second map including pixel count values associated with at least one stationary object;
computing, via the one or more processors, a rareness score for an object within the scene, based on at least one of the first map or the second map;
storing a list of objects previously associated with rareness scores that exceed a threshold value;
comparing pixel locations of the object with pixel locations of objects from the list of objects; and
when the rareness score exceeds the threshold value:

generating a signal representing an alert in response to the pixel locations of the object not matching the pixel locations of the objects from the list of objects, and sending the signal representing the alert.

2. The computer-implemented method of claim 1, wherein computing the rareness score is further based on a stationarity of the object within the scene.

3. The computer-implemented method of claim 1, wherein generating the first map includes assigning a higher weight to pixel counts for more recently observed non-stationary objects.

4. The computer-implemented method of claim 1, wherein generating the second map includes assigning a higher weight to pixel counts for more recently observed stationary objects.

5. The computer-implemented method of claim 1, wherein generating at least one of the first map or the second map includes detecting an amount of overlap between bounding boxes among a predetermined number of video frames from the plurality of video frames, the bounding boxes associated with the object.

6. The computer-implemented method of claim 1, further comprising:
storing a list of substantially stationary objects identified, based on a first subset of video frames from the plurality of video frames, as no longer being visible in the scene;
upon detecting a new object in the scene based on a second subset of video frames from the plurality of video frames, comparing the new object to the substantially stationary objects from the list of substantially stationary objects; and
upon determining that the new object matches a substantially stationary object from the list of substantially stationary objects, calculating a duration for which the new object has remained in the scene.

7. The computer-implemented method of claim 1, wherein the rareness score is further based on observed frequencies of stationary objects and non-stationary objects in regions of the scene.

8. The computer-implemented method of claim 1, further comprising:
updating at least one of the first map or the second map based on observed behavior of the object within the scene.

9. The computer-implemented method of claim 1, further comprising:
assigning an indicator for the alert, the indicator representing a severity of the alert.

10. An apparatus, comprising:
a processor; and
a memory operatively coupled to the processor and storing instructions to cause the processor to:
analyze an input data stream including data representing a plurality of video frames;
generate a first map based on the input data stream, the first map including pixel count values associated with at least one non-stationary object;
generate a second map based on the input data stream, the second map including pixel count values associated with at least one stationary object;
calculate a rareness score based on the first map and the second map;
store a list of objects previously associated with rareness scores that exceed a threshold value;
compare pixel locations of the object with pixel locations of objects from the list of objects; and
when the rareness score exceeds the threshold value:
generate a signal representing an alert in response to the pixel locations of the object not matching the pixel locations of the objects from the list of objects, and
send the signal representing the alert.

11. The apparatus of claim 10, wherein the plurality of video frames depict a scene, and the computing the rareness score is further based at least on a stationarity of an object within the scene.

12. The apparatus of claim 10, wherein the instructions to cause the processor to generate the first map include instructions to assign weights to pixel counts associated with the at least one non-stationary object, the weights for recently observed non-stationary objects being greater than the weights for less-recently observed non-stationary objects.

13. The apparatus of claim 12, wherein the instructions to cause the processor to generate the second map include instructions to assign weights to pixel counts associated with the at least one stationary object, the weights for recently observed stationary objects being greater than the weights for less-recently observed stationary objects.

14. The apparatus of claim 10, wherein the plurality of video frames depict an object in a scene, and at least one of the instructions to cause the processor to generate the first map or the instructions to cause the processor to generate the second map include instructions to detect an amount of overlap between bounding boxes among a predetermined number of video frames from the plurality of video frames, the bounding boxes associated with the object.

15. The apparatus of claim 10, wherein the plurality of video frames depict a scene, the memory further storing instructions to cause the processor to:
storing a list of substantially stationary objects no longer visible in the scene;
upon detecting a new object, comparing the new object to the substantially stationary objects from the list of substantially stationary objects; and
upon determining that the new object matches a substantially stationary object from the list of substantially stationary objects, calculating a duration for which the new object has remained in the scene.

16. The apparatus of claim 10, wherein the plurality of video frames depict a scene, the instructions to calculate the rareness score including instructions to calculate the rareness score based on observed frequencies of stationary objects and non-stationary objects in regions of the scene.

17. The apparatus of claim 16, wherein the memory further stores instructions to cause the processor to:
update at least one of the first map or the second map based on observed behavior of the object.

18. The apparatus of claim 10, wherein the memory further stores instructions to cause the processor to:
assign a value for the alert, the value representing a severity of the alert.

* * * * *